UNITED STATES PATENT OFFICE.

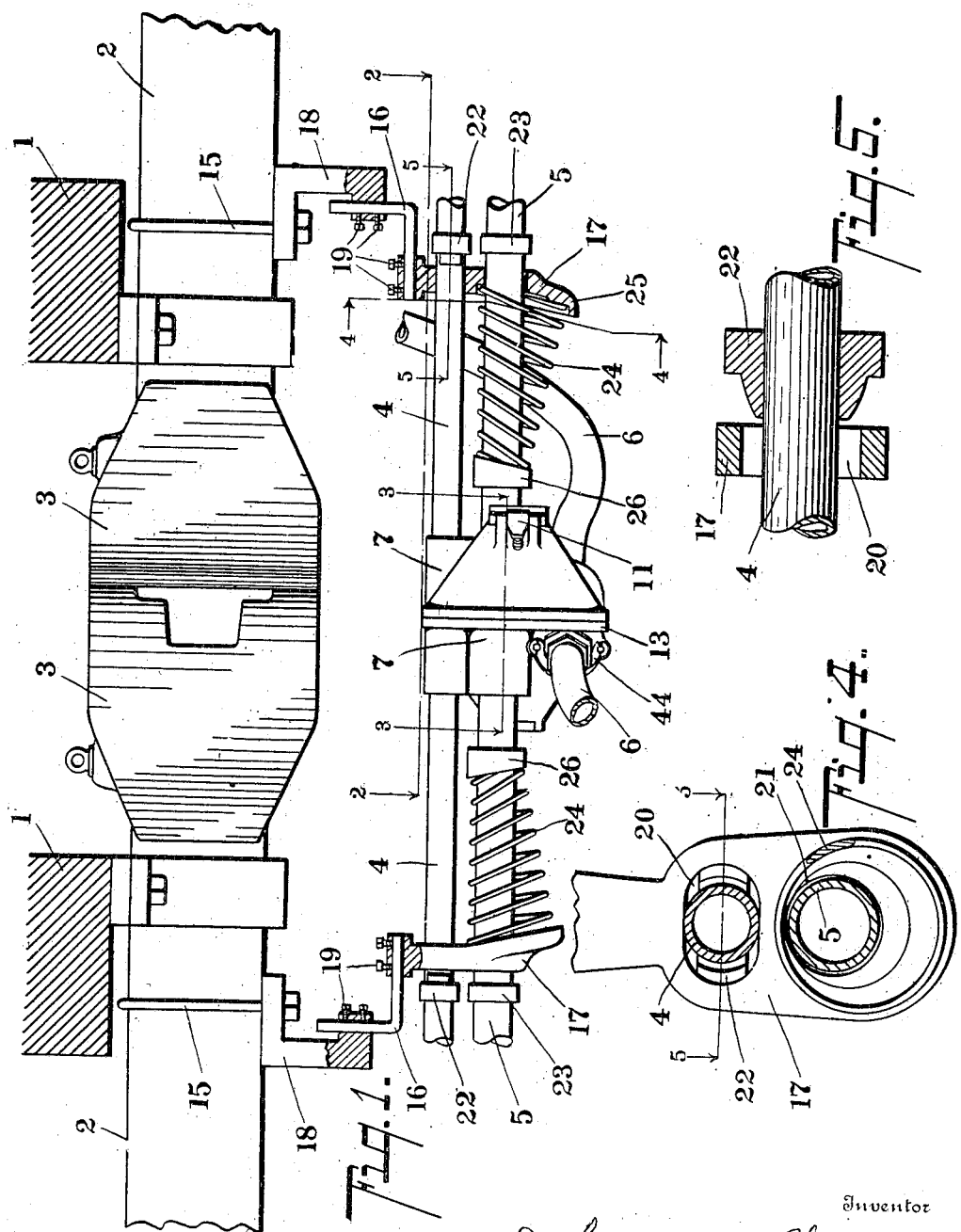

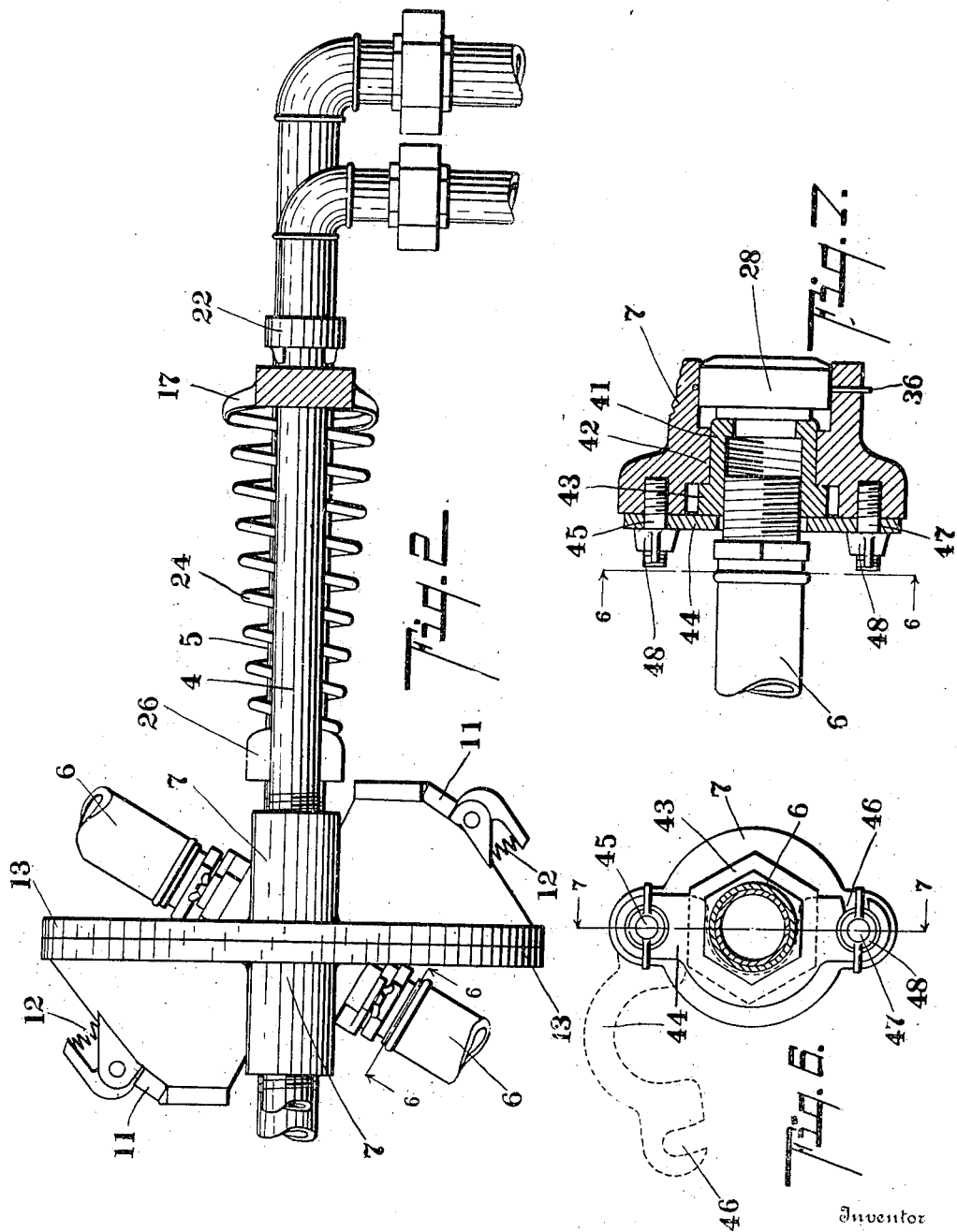

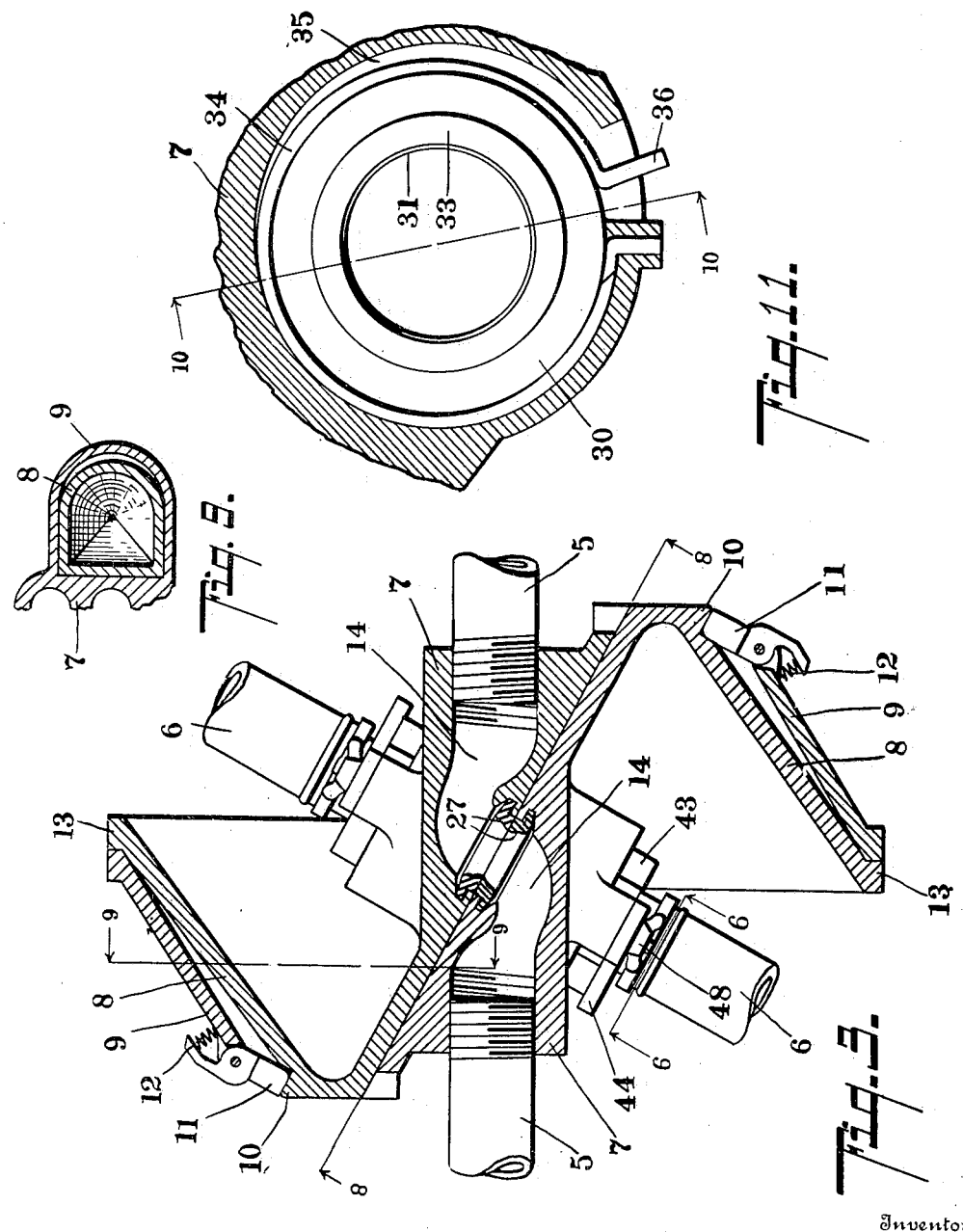

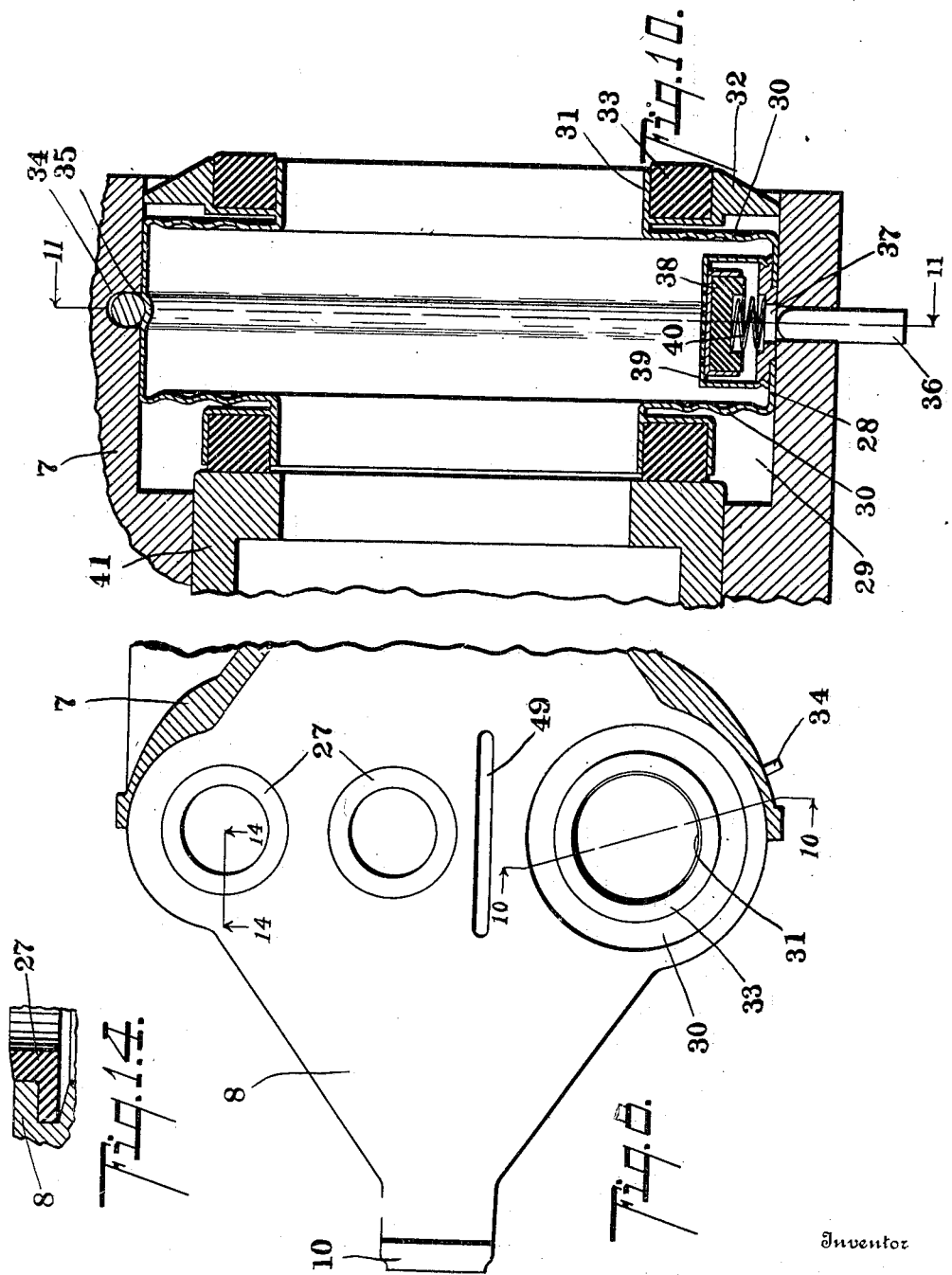

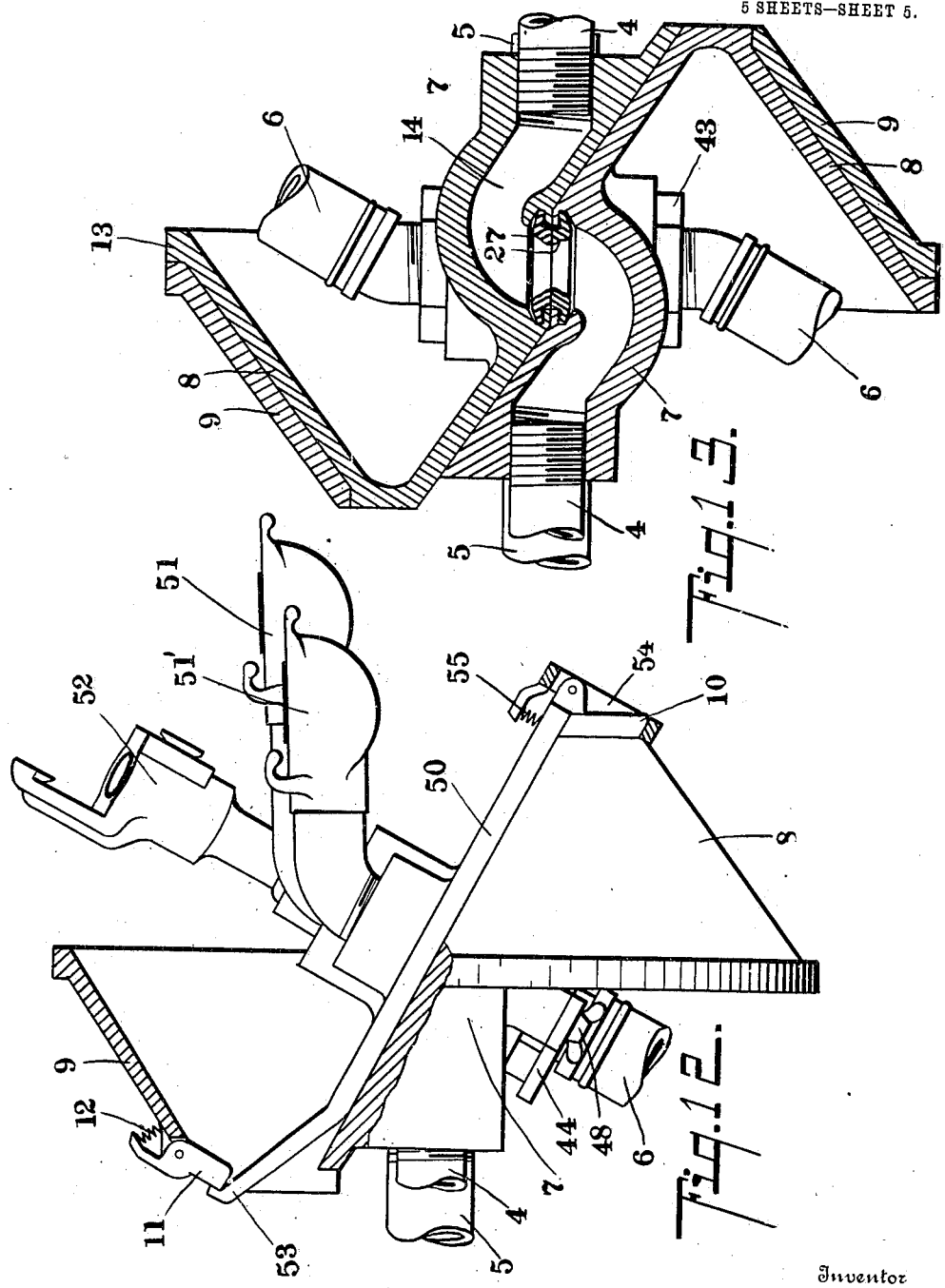

JOHN HENRY PHILLIPS, JR., OF JACKSON, MICHIGAN.

PIPE OR HOSE COUPLING.

946,396.

Specification of Letters Patent.

Patented Jan. 11, 1910.

Application filed January 10, 1908. Serial No. 410,161.

*To all whom it may concern:*

Be it known that I, JOHN HENRY PHILLIPS, Jr., a citizen of the United States, residing in the city and county of Jackson, State of Michigan, have invented certain new and useful Improvements in Pipe or Hose Couplings, of which the following is a specification.

This invention relates to improvements in pipe or hose couplings.

My improved pipe or hose coupling is particularly adapted, and, as shown in the drawing, is designed for use as a coupling for the steam and air pipes of railway trains, although it is applicable, and certain features thereof are very desirable for use in various other relations.

The main objects of this invention are: First, to provide an improved coupling for the pipes of railway trains which is adapted to automatically couple and uncouple all of the pipes of a train, both steam and air, upon the coupling and uncoupling of the cars; second, to provide an improved coupling in which the pressure within the pipe, or pipes coupled, tends to hold the coupling members together rather than to separate them; third, to provide an improved coupling for the pipes of railway trains which may be readily attached to the cars and readily adjusted to cars of different construction and heights; fourth, to provide an improved coupling which is very simple in construction and very durable in use, the wear thereon being very slight; fifth, to provide an improved coupling for the pipes of railway trains in which a car equipped with a combination coupler may be readily coupled or connected to a car equipped with individual couplings; sixth, to provide in a coupling an improved packing ring; seventh, to provide in a coupling an improved construction and arrangement of parts which may be very quickly assembled or disassembled in manufacture, or for the purpose of renewing the parts.

Further objects, and objects relating to structural details, will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawing, forming a part of this specification, in which.

Figure 1 is a detail side elevation of a structure embodying the features of my invention; Fig. 2 is an enlarged detail horizontal section taken on a line corresponding to line 2—2 of Fig. 1; Fig. 3 is an enlarged detail horizontal section taken on a line corresponding to line 3—3 of Fig. 1, through the coupling heads; Fig. 4 is an enlarged detail vertical section taken on a line corresponding to the broken line 4—4 of Fig. 1, showing details of one of the supports or hangers; Fig. 5 is an enlarged detail taken on a line corresponding to line 5—5 of Figs. 1 and 4; Fig. 6 is a detail taken on a line corresponding to line 6—6 of Figs. 2 and 7, showing the connection for the steam pipe to one of the coupler heads or members; Fig. 7 is a detail section taken on a line corresponding to line 7—7 of Fig. 6; Fig. 8 is a detail section of one of the coupler heads or members, taken on a line corresponding to line 8—8 of Fig. 3; Fig. 9 is a detail cross section taken on a line corresponding to line 9—9 of Fig. 3; Fig. 10 is an enlarged detail section taken on a line corresponding to the line 10—10 of Fig. 11, showing details of the packing ring for steam pipe couplings; Fig. 11 is a detail section taken on a line corresponding to line 11—11 of Fig. 10; Fig. 12 is a detail showing an emergency coupling member, or the coupling member used when it is desired to couple a car equipped with individual couplings to a car equipped with one of my improved combination couplers; Fig. 13 is a detail section, corresponding to that of Fig. 3, of a modified construction. Fig. 14 is a detail section, taken on line 14—14 of Fig. 8, showing details of the packing rings.

In the drawing, the sectional views are taken looking in the direction of the little arrows at the ends of the section lines, and similar numerals of reference refer to similar parts throughout the several views.

Referring to the drawing, 1—1 represents the end sills or frame pieces of a pair of railway cars; 2 the draw bars; and 3 the drawheads thereof. The pipe sections 4, 5 and 6 are the air, air-brake and steam pipes, respectively, of the cars. The steam pipe 6 is preferably a flexible hose, while the pipes 4 and 5 are rigid and connected to the pipes of the cars by suitable flexible joints, preferably such as I have illustrated in my application for Letters Patent filed July 26, 1907, Serial No. 385,716, the details of this connection not being here illustrated.

Each set of pipe sections is provided with a coupling member, comprising a head 7 having a forwardly-projecting tapered male member 8 at one side, and a corresponding tapered female member or socket 9 at the other side adapted to receive the male member of the opposite head. The members 8 are preferably provided with an outwardly-facing catch 10 at their outer ends with which the pivoted latches 11 engage when the heads are brought into their coupled relation. These latches 11 are held in their engaging position by means of the springs 12.

The inner ends of the female members 9 are preferably open to receive the catch portions 10 of the male members, as illustrated in Fig. 3. The inner walls of the members 8 and 9 are preferably flattened, and are preferably arranged to lie in the same plane to form the faces of the coupling heads, the faces being inclined to the longitudinal axis of the heads. By this arrangement, when the heads are brought together—owing to the shape of the members 8 and 9—the faces are clamped against each other with a wedge-like action.

The members 8 are provided with flange-like stops 13 at their rear ends which limit their forward movement, thereby bringing the packing rings into proper relation. The passages 14 of the coupling heads are preferably arranged to deliver at an angle to the longitudinal axis of the heads, so that the pressure within the pipes tends to hold the heads together rather than to separate the same, that is, it tends to hold the catch and their latch members in engagement; at the same time, the heads readily separate when pulled rearwardly as in the uncoupling of the cars to which they are attached.

The coupling members are preferably supported by hangers consisting of the draw bar clips 15, the angle or L-shaped bars 16, and the hanger plates 17, through which the pipe sections 4 and 5 are arranged. The angle bars 16 are adjustably secured to the clip pieces 18 and the hanger plates 17 by means of suitable screws 19, so that the hangers may be adjusted to bring the coupling members into proper position on cars of different sizes or build.

The holes 20 and 21 in the hanger plates, through which the pipes 4 and 5 are arranged, are preferably of suitable size and shape so that the pipes may swing laterally therein. They are also of sufficient size so that the heads 7 have a slight vertical movement. The pipes are provided with collars 22 and 23, arranged to the rear of the hanger plates to limit their forward movement.

The coupling members are held yieldingly forward by means of the coiled springs 24. These springs are preferably of the spiral type and arranged about the pipe sections 5, suitable seats, as 25, being provided in the hanger plates for the base of the springs, and collars 26 being arranged on the pipes 5 to receive the thrust of the springs. The seats 25 are inclined slightly so that the springs not only hold the heads yieldingly forward, but hold them in substantially a horizontal position as well,—that is, these springs have a slight upward lift which counter-balances the weight of the heads. When a pair of cars equipped with these coupling members is brought together, the heads are guided by means of the members 8 and 9 into proper relation. The members are preferably tapered, as stated, so that the faces of the heads are brought together with a wedge-like or clamping action.

The packing rings 27 for the pipes are preferably rubber, or a suitable yielding composition, the heads being provided with suitable seats to receive the same. These packing rings normaly project slightly beyond the faces of the heads, so that they are compressed somewhat when the heads are coupled. These packing rings are preferably beveled, as illustrated, so that the parts slide together without injury thereto, see Figs. 10 and 14.

I preferably provide my improved coupling with a special form of packing ring for the steam pipe. This packing ring shown in detail in Fig. 10, is a modification, and, in some respects, an improvement upon the packing ring described in my application for Letters Patent above refered to. This packing ring consists of a sleeve-like ring 28, which is sleeved into a suitable socket 29 provided therefor in the coupling head. The ring 28 is provided with flange-like arms 30, the arms being preferably provided with annular corrugations, as is described in the case above referred to. The bearing lip 31, for the outer arm 30 of the packing ring, is preferably adapted to fit within the socket, and is provided with an outer beveled portion 32, and an annular groove or seat in which the gasket 33 is arranged. The bearing ring and the flange 30 are preferably secured at their inner edges only, as clearly appears from the drawing. The bearing ring of the inner flange 30 is preferably the same in structure as that of the outer arm except that the beveled portion 32 is omitted.

By thus constructing the packing rings, the coupling heads readily slide together, and, after being brought together, the resiliency of the flange and the pressure of the steam form perfect joints. The packing ring is preferably retained in its socket by means of the ring 34, which is arranged in a suitable annular groove 35. The ring 34 is adapted to clamp the packing ring, effectively retaining it in its socket. When it is desired to remove the packing ring, the ring 34 is released by means of the finger piece 36; see Fig. 11. The packing ring 28 is provided with a drip opening 37. This opening is controlled by the valve 38, the pressure of the steam being adapted to close the valve against the tension of the valve spring. When the steam is off, the spring lifts the valve, thereby opening the drip. The valve is arranged in a casing 39, and is held in its open position by the springs 40 arranged under the same.

The steam pipe 6 is preferably secured to the coupling head by means of a special connection consisting of a pipe connecting member 41, which is threaded upon the end of the pipe, as is illustrated in Figs. 6 and 7. The packing ring socket is provided with a reduced portion 42, adapted to receive the pipe connecting member 41, the forward end of the pipe connecting member being arranged to be engaged by the inner bearing lip of the packing ring 28. The pipe connecting member is provided with a flange 43, which shoulders against the reduced portion 42 of the socket and is held therein by means of the retaining plate 44. This plate is pivoted on a threaded pin 45, and is provided with a notch 46 adapted to engage the pin 47, the pins being provided with thumb-screws 48 so that the plate may be readily secured or released to secure or release the pipe. This affords a rapid and secure means of connecting the steam hose or pipe, which permits its being disconnected or renewed, should occasion require, with little difficulty. The coupling heads are preferably provided with openings 49 above the steam passages, so that a circulation of air is secured, and the heads prevented from becoming unduly heated.

In the modification shown in Fig. 13, the catches 10 are omitted. This form is satisfactory, but the form shown as the preferred construction has the advantage of the members coupling with less wear and friction upon each other. This modified construction, however, possesses the same advantages of the pressure of the steam serving to hold the heads together rather than tending to separate them, that is, the pressure of the steam serves to hold the latch members in engagement rather than to separate them and also the same advantage of the wedging or clamping action of the faces of the heads upon each other in coupling.

As it is sometimes desirable to use one of my improved couplers in connection with a car equipped with individual couplers, I provide what I designate as an emergency head, the same being illustrated in Fig. 12. This preferably consists of the head 5 having coupling members 51, 51' and 52, which are adapted to be connected with the couplings now generally used. The head 50 is provided with a packing ring adapted to co-act with the packing rings described, and is provided with a hook 53 at its inner end, which may be engaged on the latch 11 and with the pivoted latch 54 at its outer end, which may be engaged over the catch 10 of the male member of the opposite head. The latch 54 is preferably in the form of a ring, and is held in its engaging position by means of the springs 55. This emergency head has the advantage of being quickly attached and at the same time it is secure when attached.

By forming and arranging the parts as I have illustrated and described, I secure a coupling which is adapted to automatically couple or uncouple on the coupling or uncoupling of the cars, and, at the same time, it is very secure. The structure is comparatively simple and economical to manufacture, and is very durable in use.

I have illustrated and described my improved coupling in detail in the form preferred by me on account of its structural simplicity and economy. I am, however, aware that it is capable of considerable variation in structural details without departing from my invention, and I desire to be understood as claiming the same specifically as illustrated, as well as broadly.

Having thus described my invention, what I claim as new and desire to secure by Letters Patent is:

1. In a coupling for train pipes, the combination with a pair of draw bars, of a pair of coupling members each comprising a coupling head having a forwardly-projecting male portion at one side and a corresponding female portion at the other side adapted to receive the male portion of the opposite head, the inner walls of the male and female portions forming the face of the head, the said face being inclined to the longitudinal axis of the head and being provided with a plurality of packing rings arranged in a vertical series therein, said male portion being provided with an outwardly-facing catch at its forward end; a spring latch on said female portion adapted to engage said catch; a plurality of pipe sections to be coupled on which said heads are mounted; hangers comprising hanger plates through which said pipe sections are arranged, the openings in said plates being oblong to permit the lateral swinging of the pipes therein, hanger clips for said draw bars, angle bars adjustably connected to said clips and to said hanger plates, collars on said pipe sections located to the rear of said hanger plates for limiting the forward movement of the said coupling members, spiral springs seated on said hanger plates arranged about the said pipe sections; and collars on said pipe sections adapted to form seats for the forward ends of said springs whereby said coupling members are held yieldingly forward.

2. In a coupling for train pipes, the combination with a pair of coupling members, each comprising a coupling head having a forwardly-projecting male portion at one side and a corresponding female portion at the other side adapted to receive the male portion of the opposite head, the inner walls of the male and female portions forming the face of the head, the said face being inclined to the longitudinal axis of the head and being provided with a plurality of packing rings arranged in a vertical series therein, said male portion being provided with an outwardly-facing catch at its forward end; a spring latch on said female portion adapted to engage said catch; a plurality of pipe sections to be coupled on which said heads are mounted; hangers comprising hanger plates through which said pipe sections are arranged, the openings in said plates being oblong to permit the lateral swinging of the pipes therein, collars on said pipe sections located to the rear of said hanger plates for limiting the forward movement of the said coupling members, spiral springs seated on said hanger plates arranged about the said pipe sections; and collars on said pipe sections adapted to form seats for the forward ends of said springs whereby said coupling members are held yieldingly forward.

3. In a coupling for train pipes, the combination with a pair of draw bars, of a pair of coupling members, each comprising a coupling head having a forwardly-projecting male portion at one side and a corresponding female portion at the other side adapted to receive the male portion of the opposite head, the inner walls of the male and female portions forming the face of the head, the said face being inclined to the longitudinal axis of the head and being provided with a plurality of packing rings arranged in a vertical series therein; a plurality of pipe sections to be coupled on which said heads are mounted; hangers comprising hanger plates through which said pipe sections are arranged, the openings in said plates being oblong to permit the lateral swinging of the pipes therein, hanger clips for said draw bars, angle bars adjustably connected to said clips and to said hanger plates, collars on said pipe sections located to the rear of said hanger plates for limiting the forward movement of the said coupling members, spiral springs seated on said hanger plates arranged about the said pipe sections; and collars on said pipe sections adapted to form seats for the forward ends of said springs whereby said coupling members are held yieldingly forward.

4. In a coupling for train pipes, the combination with a pair of coupling members each comprising a coupling head having a forwardly-projecting male portion at one side and a corresponding female portion at the other side adapted to receive the male portion of the opposite head, the inner walls of the male and female portions forming the face of head, the said face being inclined to the longitudinal axis of the head and being provided with a plurality of packing rings arranged in a vertical series therein; a plurality of pipe sections to be coupled on which said heads are mounted; hangers comprising hanger plates through which said pipe sections are arranged, the openings in said plates being oblong to permit the lateral swinging of the pipes therein, collars on said pipe sections located to the rear of said hanger plates for limiting the forward movement of the said coupling members, spiral springs seated on said hanger plates arranged about the said pipe sections; and collars on said pipe sections adapted to form seats for the forward ends of said springs whereby said coupling members are held yieldingly forward.

5. In a coupling for train pipes, the combination with a pair of coupling members each comprising a coupling head having a forwardly-projecting tapered male portion at one side and a corresponding tapered female portion at the other side adapted to receive the male portion of the opposite head, the inner walls of the male and female portions forming the face of the head, the said face being inclined to the longitudinal axis of the head and being provided with a plurality of packing rings arranged in a vertical series therein, said male portion being provided with an outwardly-facing catch at its forward end; a spring latch on said female portion adapted to engage said catch; a plurality of pipe sections to be coupled on which said heads are mounted; hangers comprising hanger plates through which said pipe sections are arranged; and spiral springs seated on said hanger plates arranged about the said pipe sections and connected thereto whereby said members are held yieldingly forward.

6. In a coupling for train pipes, the combination with a pair of coupling members, each comprising a coupling head having a forwardly-projecting tapered male portion at one side and a corresponding tapered female portion at the other side adapted to receive the male portion of the opposite head, the inner walls of the male and female portions forming the face of the head, the said face being inclined to the longitudinal axis of the head and being provided with a plurality of packing rings arranged in a vertical series therein, said male portion being provided with an outwardly-facing catch at its forward end; a spring latch on said female portion adapted to engage said catch; a plurality of pipe sections to be coupled on which said heads are mounted; hangers, and means for holding said members yieldingly forward.

7. In a coupling for train pipes, the combination with a pair of coupling members each comprising a coupling head having a forwardly-projecting male portion at one side and a corresponding female portion at the other side adapted to receive the male portion of the opposite head, the face of the head being inclined to the longitudinal axis of the head and being provided with a plurality of packing rings arranged in a vertical series therein, said male portion being provided with an outwardly-facing catch at its forward end; a spring latch on said female portion adapted to engage said catch; a plurality of pipe sections to be coupled on which said heads are mounted; hangers comprising hanger plates through which said pipe sections are arranged, and spiral springs seated on said hanger plates arranged about the said pipe sections and connected thereto, whereby said members are held yieldingly forward.

8. In a coupling for train pipes, the combination with a pair of coupling members each comprising a coupling head having a forwardly-projecting male portion at one side and a corresponding female portion at the other side adapted to receive the male portion of the opposite head, the face of the head being inclined to the longitudinal axis of the head and being provided with a plurality of packing rings in a vertical series therein, said male portion being provided with an outwardly-facing catch at its forward end; a spring latch on said female portion adapted to engage said catch; a plurality of pipe sections to be coupled on which said heads are mounted; hangers; and means for holding said heads yieldingly forward.

9. In a coupling for train pipes, the combination with a pair of draw bars, of coupling members each comprising a coupling head provided with a plurality of packing rings arranged in a vertical series therein; a plurality of pipe sections to be coupled on which said heads are mounted; hangers comprising hanger plates through which said pipe sections are arranged, the openings in said plates being oblong to permit the lateral swinging of the pipe sections therein, hanger clips for said draw bars, angle bars adjustably connected to said clips and to said hanger plates, collars on said pipe sections located to the rear of said hanger plates for limiting the forward movement of the coupling members, spiral springs seated on said hanger plates arranged about the said pipe sections; and collars on said pipe sections adapted to form seats for the forward ends of said springs whereby said coupling members are held yieldingly forward.

10. In a coupling for train pipes, the combination with a pair of coupling members each comprising a coupling head provided with a plurality of packing rings arranged in a vertical series therein; a plurality of pipe sections to be coupled on which said heads are mounted; hangers comprising hanger plates through which said pipe sections are arranged; the openings in said plates being oblong to permit the lateral swinging of the pipe sections therein, collars on said pipe sections located to the rear of said hanger plates for limiting the forward movement of the coupling members, spiral springs seated on said hanger plates arranged about the said pipe sections; and collars on said pipe sections adapted to form seats for the forward ends of said springs whereby said coupling members are held yieldingly forward.

11. In a coupling, the combination with a plurality of pipes to be coupled, of a pair of coupling members, each comprising a coupling head having a forwardly-projecting male portion at one side and a corresponding female portion at the other side adapted to receive the male portion of the opposite head, the inner walls of the male and female portions being in the same plane and flattened to form the face of the head, said face being inclined to the longitudinal axis of the head and being provided with a plurality of packing rings arranged in a vertical series therein, said male portion being provided with an outwardly-facing catch at its forward end and said female portion being open at its rear end to receive said catch; and a latch on said female portion adapted to engage said catch.

12. In a coupling, the combination with a plurality of pipes to be coupled, of a pair of coupling members each comprising a coupling head having a forwardly-projecting male portion at one side and a corresponding female portion at the other side adapted to receive the male portion of the opposite head, the inner walls of the male and female portions forming the face of the head, said face being inclined to the longitudinal axis of the head and being provided with a plurality of packing rings arranged in a vertical series therein, said male portion being provided with an outwardly-facing catch at its forward end and said female portion being open at its rear end to receive said catch; and a latch on said female portion adapted to engage said catch.

13. In a coupling, the combination with a plurality of pipes to be coupled, of a pair of coupling members each comprising a coupling head having a forwardly-projecting male portion at one side and a corresponding female portion at the other side adapted to receive the male portion of the opposite head, the face of the head being inclined to its longitudinal axis and being provided with a plurality of packing rings arranged in a vertical series, therein, said male portion being provided with an outwardly facing catch at its forward end; and a latch on said female portion adapted to engage said catch.

14. In a coupling, the combination with a pair of coupling members, each comprising a coupling head having a forwardly-projecting tapered male portion at one side and a corresponding tapered female portion at the other side adapted to receive the male portion of the opposite head, the inner walls of the male and female portions being in the same plane and flattened to form the face of the head, the said face being inclined to the longitudinal axis of the head, said male portion being provided with an outwardly-facing catch at its forward end; and a latch on said female portion adapted to engage said catch.

15. In a coupling, the combination of a pair of coupling members, each comprising a coupling head having a forwardly-projecting tapered male portion at one side and a corresponding tapered female portion at the other side adapted to receive the male portion of the opposite head; the inner walls of the male and female portions forming the face of the head, the said face being inclined to the longitudinal axis of the head, said male portion being provided with an outwardly-facing catch at its forward end; and a latch on said female portion adapted to engage said catch.

16. In a coupling, the combination of a pair of coupling members, each comprising a coupling head having a forwardly-projecting male portion at one side and a corresponding female portion at the other side adapted to receive the male portion of the opposite head, the inner walls of the male and female portions being in the same plane and flattened to form the face of the head, the said face being inclined to the longitudinal axis of the head, said male portion being provided with an outwardly-facing catch at its forward end; and a latch on said female portion adapted to engage said catch.

17. In a coupling, the combination of a pair of coupling members, each comprising a coupling head having a forwardly-projecting male portion at one side and a corresponding female portion at the other side adapted to receive the male portion of the opposite head, the inner walls of the male and female portions forming the face of the head, the said face being inclined to the longitudinal axis of the head, said male portion being provided with an outwardly-facing catch at its forward end; and a latch on said female portion adapted to engage said catch.

18. In a coupling, the combination of a pair of coupling members, each comprising a coupling head having a forwardly-projecting tapered male portion at one side and a corresponding tapered female portion at the other side adapted to receive the male portion of the opposite head, the face of the head being inclined to its longitudinal axis, said male portion being provided with an outwardly-facing catch at its forward end; and a latch on said female portion adapted to engage said catch.

19. In a coupling, the combination of a pair of coupling members, each comprising a coupling head having a forwardly-projecting male portion at one side, and a corresponding female portion at the other side adapted to receive the male portion of the opposite head, the face of the head being inclined to its longitudinal axis, said male portion being provided with an outwardly-facing catch at its forward end; and a latch on said female portion adapted to engage said catch.

20. In a coupling, the combination with a pair of coupling members, each comprising a coupling head, having a passage therein; and latch members arranged on said head to co-act with the latch members of the opposite head, said passage being arranged at an angle to the longitudinal axis of said head, and so that the pressure in the passages tends to hold the latch members together.

21. In a structure of the class described, the combination with a coupling head having a cylinder-like packing ring socket therein, said socket having a reduced central portion; a pipe; a pipe connecting member arranged in said socket, said connecting member being adapted to fit the said reduced portion of said socket and having a flange adapted to fit against the same; means for holding the said pipe connecting member in said socket; and a packing ring U-shaped in cross section sleeved into said socket, the inner arm of said packing ring being arranged to bear against the end of said pipe connecting member.

22. In a structure of the class described, the combination with a coupling head having a cylinder-like packing ring socket therein, said socket having a reduced central portion; a pipe; a pipe connecting member arranged in said socket; means for holding the said pipe connecting member in said socket; and a packing ring U-shaped in cross section sleeved into said socket, the inner arm of said packing ring being arranged to bear against the end of said pipe connecting member.

23. In a structure of the class described, the combination with a coupling head having a cylinder-like packing ring socket therein, said socket having a reduced central portion; a pipe; a pipe connecting member arranged in said socket, said connecting member being adapted to fit the said reduced portion of said socket and having a flange adapted to fit against the same; means for holding the said pipe connecting member in said socket; and a packing ring sleeved into said socket arranged to bear against the end of said pipe connecting member.

24. In a structure of the class described, the combination with a coupling head having a cylinder-like packing ring socket therein, said socket having a reduced central portion; a pipe; a pipe connecting member arranged in said socket; means for holding the said pipe connecting member in said socket; and a packing ring sleeved into said socket arranged to bear against the end of said pipe connecting member.

25. In a structure of the class described, the combination of a coupling head having a cylinder-like packing ring socket; a sleeve-like packing ring sleeved into said socket, the said packing ring having an inwardly-projecting flange at its outer end; a ring-like bearing lip for said packing ring mounted on the said flange, said bearing lip being adapted to fit the said socket and being beveled at its outer edge and having an annular groove at its inner edge; and a gasket arranged in said groove, said bearing lip and flange being secured together at their inner edges only.

26. In a structure of the class described, the combination of a coupling head having a cylinder-like packing ring socket; a sleeve-like packing ring sleeved into said socket, the said packing ring having an inwardly-projecting flange at its outer end; a ring-like bearing lip for said packing ring mounted on the said flange, said bearing lip being adapted to fit the said socket and being beveled at its outer edge and having an annular groove at its inner edge; and a gasket arranged in said groove.

27. In a structure of the class described, the combination of a coupling head having a cylinder-like packing ring socket; a sleeve-like packing ring sleeved into said socket, the packing ring having an inwardly-projecting flange at its outer end; a ring-like bearing lip for said packing ring mounted on the said flange, said bearing lip being beveled at its outer edge and having an annular groove at its inner edge; and a gasket arranged in said groove, said bearing lip and flange being secured together at their inner edges only.

28. In a structure of the class described, the combination of a coupling head having a cylinder-like packing ring socket; a sleeve-like packing ring sleeved into said socket, the said packing ring having an inwardly-projecting flange at its outer end; a ring-like bearing lip for said packing ring mounted on the said flange, said bearing lip being beveled at its outer edge and having an annular groove at its inner edge; and a gasket arranged in said groove.

29. In a structure of the class described, the combination of a coupling head having a cylinder-like packing ring socket; a sleeve-like packing ring sleeved into said socket, the said packing ring having an inwardly-projecting flange at its outer end; a bearing lip for said flange consisting of an annular gasket holder; and a gasket arranged therein, said gasket holder and flange being secured together at their inner edges only.

30. In a structure of the class described, the combination of a coupling head having a cylinder-like packing ring socket; a sleeve-like packing ring sleeved into said socket, the said packing ring having an inwardly-projecting flange at its outer end; a bearing lip for said flange consisting of an annular gasket holder; and a gasket arranged therein.

31. In a structure of the class described, the combination of a coupling head having a cylinder-like packing ring socket; a U-shaped packing ring of spring metal sleeved into said socket; and bearing lips for the arms of said packing ring consisting of annular gasket holders and gaskets arranged therein, said gasket holders and the arms of said packing ring being secured together at their inner edges only.

32. In a structure of the class described, the combination of a coupling head having a cylinder-like packing ring socket; a U-shaped packing ring of spring metal sleeved into said socket; and bearing lips for the arms of said packing ring consisting of annular gasket holders having groove like seats therein and gaskets arranged in said seats.

33. In a coupling, the combination of a pair of coupling members, each comprising a coupling head having a forwardly projecting male portion at one side and a corresponding female portion at the other side adapted to receive the male portion of the opposite head, said male portion being provided with an outwardly facing catch at its forward end and a latch on said female portion adapted to engage said catch.

34. In a coupling, the combination with a pair of coupling members, each comprising a coupling head having a forwardly-projecting male portion at one side and a corresponding female portion at the other side, adapted to receive the male portion of the opposite head, the face of the head being inclined to its longitudinal axis, said male portion being provided with an outwardly-facing catch, the engaging portion of said catch being in a plane substantially parallel with the face of the head; and a latch on said female portion adapted to engage said catch.

35. In a coupling, the combination with a pair of coupling members, each comprising a coupling head having a forwardly-projecting male portion at one side and a corresponding female portion at the other side, adapted to receive the male portion of the opposite head, said male portion being provided with an outwardly-facing catch, the engaging portion of said catch being in a plane substantially parallel with the face of the head; and a latch on said female portion adapted to engage said catch.

In witness whereof, I have hereunto set my hand and seal in the presence of two witnesses.

JOHN HENRY PHILLIPS, JR. [L. S.]

Witnesses:
LACERNE PATCH,
ANTHONY J. PATCH.